US005481188A

United States Patent [19]
Mizutani

[11] Patent Number: 5,481,188
[45] Date of Patent: Jan. 2, 1996

[54] METHOD AND APPARATUS FOR DETECTING THE MOVEMENT OF AN OBJECT WITH A MICRO MACHINE THAT RESPONDS TO A CHANGE IN MAGNETIC FLUX ASSOCIATED WITH THE OBJECT

[75] Inventor: Takao Mizutani, Aichi, Japan

[73] Assignee: Mitsubishi Denki Kabushiki Kaisha, Tokyo, Japan

[21] Appl. No.: 24,772

[22] Filed: Mar. 2, 1993

[30] Foreign Application Priority Data

Mar. 2, 1993 [JP] Japan ................................... 4-044736

[51] Int. Cl.$^6$ ............................... G01B 7/14; G01D 5/00
[52] U.S. Cl. ............................... 324/207.25; 324/207.21; 324/207.22; 324/660
[58] Field of Search ........................ 324/207.13, 207.22, 324/207.24, 207.25, 207.21, 660, 658; 310/309; 74/421 A

[56] References Cited

U.S. PATENT DOCUMENTS

| | | | |
|---|---|---|---|
| 4,551,676 | 11/1985 | Amemiya et al. | 324/207.21 |
| 4,746,859 | 5/1988 | Malik | 324/207.25 X |
| 4,764,767 | 8/1988 | Ichikawa et al. | 324/207.25 X |
| 5,013,954 | 5/1991 | Shibaike et al. | 310/309 |
| 5,015,906 | 5/1991 | Cho et al. | 310/309 |
| 5,252,881 | 10/1993 | Muller et al. | 310/309 |

FOREIGN PATENT DOCUMENTS

| | | | |
|---|---|---|---|
| 1576850 | 10/1980 | France . | |
| 2493981 | 5/1982 | France | 324/207.25 |
| 8330810 | 1/1984 | Germany . | |
| 3325318 | 1/1985 | Germany . | |
| 24437 | 1/1990 | Japan . | |
| 290017 | 3/1990 | Japan . | |
| 534105 | 2/1993 | Japan . | |
| 8201178 | 11/1983 | Netherlands | 324/207.25 |

OTHER PUBLICATIONS

Jorg Linders, Berlin, "MIKROMECHNNIK: Perspektiven Einer Mikrotechnik" Feinwerktechnik & Messtechnik 99 (1991) 6, pp. 275–279.
E. Voges, "Integrated Optics on Glass and Silicon for Sensor Applications", Technisches Messen 58 (1991) 4., pp. 145.
"Sensor Technology," Oct. 11, 1985, vol. t, No. 12, p. 22.

Primary Examiner—Sandra L. O'Shea
Assistant Examiner—Jay M. Patidar
Attorney, Agent, or Firm—Sughrue, Mion, Zinn, Macpeak & Seas; Richard C. Turner

[57] ABSTRACT

A device is provided to measure and record the movement of an object according to a change in magnetic flux which changes as the object moves. The device contains a micro machine which has a rotation detection member, a driving gear which is formed coaxially with the rotation detection member, and a first detection plate which is also formed coaxially with the rotation detection member. The rotation detection member rotates according to the change in magnetic flux, and the rotation of the rotation detection member causes the driving gear and the first detection plate to rotate. The driving gear engages a follower gear, so as to form a gear train, and a second detection plate is formed coaxially with the follower gear and rotates when the follower gear rotates. First and second detecting elements are respectively disposed opposite the first and second detection plates, and the position of the object is determined by the relative respective positions of the first and second detection plates and the first and second detecting elements. In addition, the invention includes a method which is performed by the device.

58 Claims, 13 Drawing Sheets

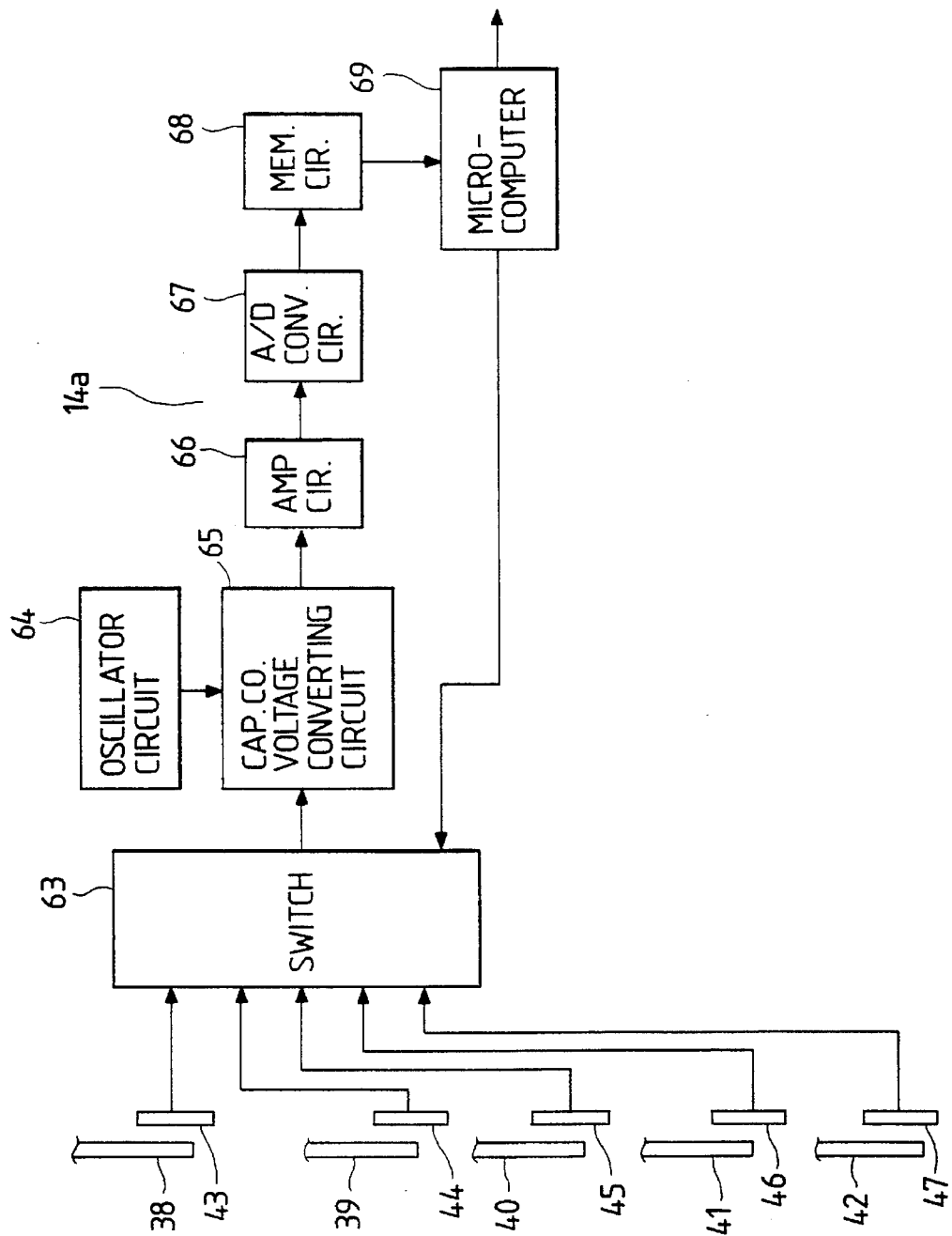

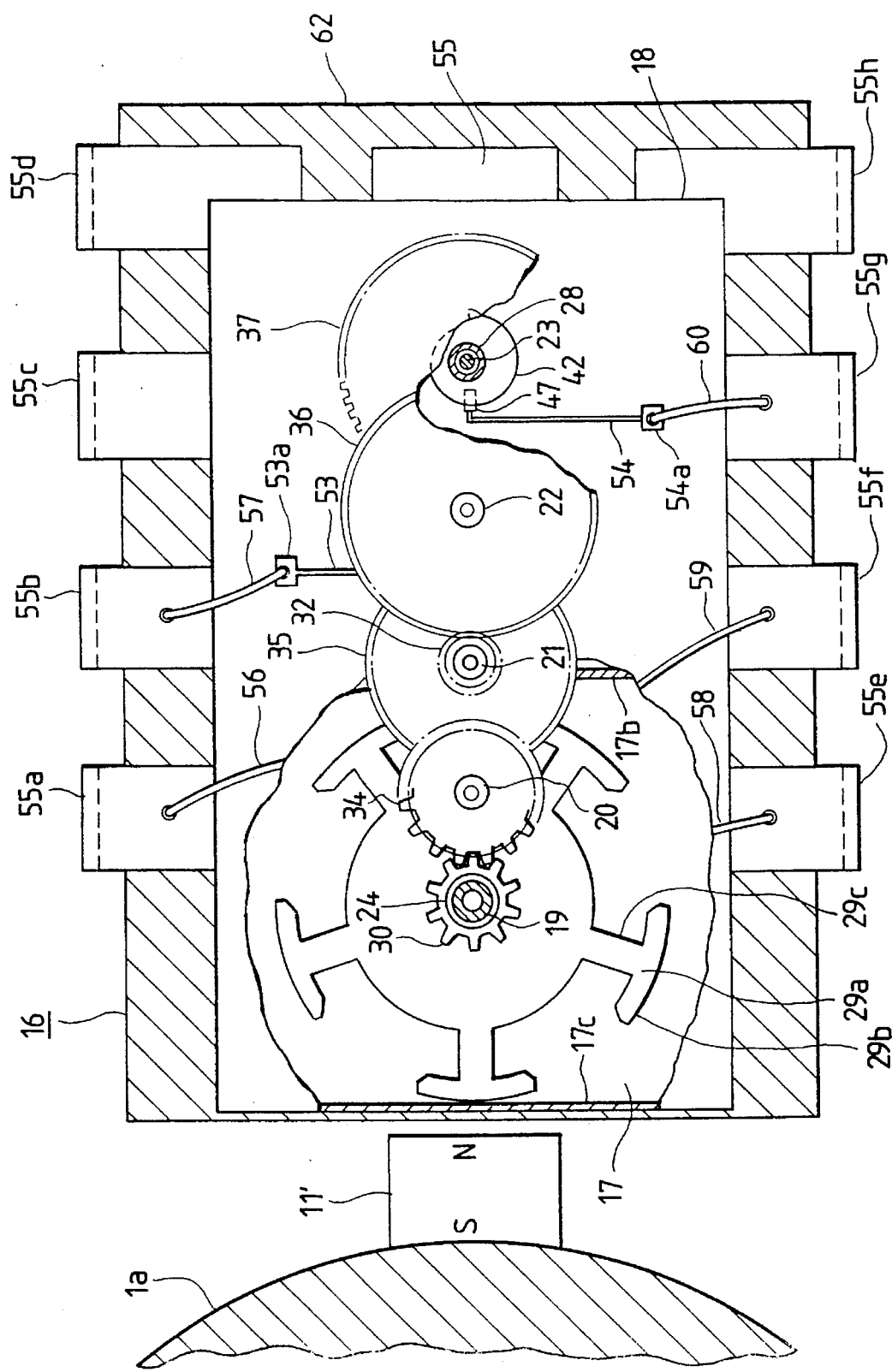

METHOD AND APPARATUS FOR DETECTING THE MOVEMENT OF AN OBJECT WITH A MICRO MACHINE THAT RESPONDS TO A CHANGE IN MAGNETIC FLUX ASSOCIATED WITH THE OBJECT

BACKGROUND OF THE INVENTION

1. Field of the Invention

The present invention relates to a method and apparatus for detecting, in the form of absolute values, the rotating position and movement of a rotary shaft driven by, for example, a servo motor.

2. Background of the Invention

A known method of detecting, in the form of absolute values, the rotating position and movement of a rotary shaft driven by, e.g., a servo motor, utilizes a plurality of position detectors, for detecting an absolute position within one full revolution of the rotary shaft. The position detectors are arranged in series with velocity reduction for each successive detector being accomplished through a gear train. One such method is disclosed in Japanese Patent Laid-open Publication 2-4437 (1990).

FIG. 19 is a schematic view showing a first conventional rotating movement detecting apparatus utilized in the method described above. The apparatus includes a first absolute position detector 1 having a rotary shaft 1a, a second absolute position detector 2 (containing a resolver, an optical absolute value encoder, etc.), a driver gear 3 fixedly mounted to the rotary shaft 1a, and a follower gear 4 fixedly mounted to a rotary shaft 2a of the second absolute position detector 2.

Another method has been proposed in which the input is reduced with the gear train of an absolute position detector and the action of each gear is detected for measuring the input movement. Such a device is disclosed in "Sensor Technology," vol. 5, no. 12, p. 22. FIG. 20 is a schematic illustration of a conventional apparatus utilized for this method, in which an absolute position detector 1 is a resolver. Illustrated are a driver gear 3 fixedly mounted to a rotary shaft 1a of the absolute position detector 1 and first and second position detecting devices 5 and 6 for dividing one revolution into tenths at low resolution. First and second position detecting devices 5 and 6 serve in combination as a rotary differential transformer. Also, a follower gear 4 and a driver gear 7 are fixedly mounted to the rotary shaft 5a of the first position detecting device 5 and a follower gear 8 is fixedly mounted to the rotary shaft 6a of the second position detecting device 6.

Still another method in which the rotating movement in an absolute position detector is detected and recorded to a memory energized by a backup battery, is disclosed in Japanese Patent Laid-open Publication 2-90017 (1990). FIG. 21 is a schematic cross-sectional view of a detecting apparatus utilized in such a method. This apparatus includes an absolute position detector 1 comprising a rotary shaft 1a, a rotary scale 1b having slits formed therein (not shown) for generating absolute code data, a light emitting diode 1c, and a photosensitive diode 1d. A magnet mounting plate 10 is fixedly mounted to the rotary shaft 1a and carries a permanent magnet 11 thereon which is magnetized in a given direction. A magnetoresistive device 12 made of a ferromagnetic material and having a high reluctance is mounted on a printed circuit board 13 so that permanent magnet 11 passes opposite to, and at a minimal distance from, magneto resistive device 12. Also, a signal processing circuit 14 is provided having a rotation signal processor circuit 14a for processing a signal from the magnetic magnetoresistive device 12 into a rotation signal which is stored and then transmitted, an absolute position signal processor circuit 14b for processing an output signal of the photosensitive diode 1d of the absolute position detector 1, and a composite signal processor circuit 14c for combining the rotation signal with an absolute position signal within one full revolution into an output signal. In addition, a backup battery 115 is provided for supplying power to the rotation signal processor circuit 14a which may be disposed remotely from the rotating movement detecting apparatus.

Another method of detecting rotational movement is disclosed in Japanese Patent Laid-open Publication 64-54309 (1989). FIG. 22 is a schematic cross-sectional view of a conventional apparatus used in this method. FIG. 23 is a front view of a magnetic bubble device 15. As illustrated in FIG. 22, a rotary shaft 1a has a permanent magnet 11, magnetized in a given direction, mounted thereon so as to pass opposite to, and at a minimal distance from, the magnetic bubble device 15. The magnetic bubble device 15 (FIG. 23) has a tip surface 15a, a magnetic transfer pattern 15b, a bubble 15c, a magnetic inductance effect element 15d, and a bubble generator 15e. Magnetic bubble technology is known in the art. For example, page 32 of the August 1987 edition of the Hitachi catalog provides a description of a magnetic bubble memory.

The operation of the conventional apparatuses described above will be explained below. In the apparatus shown in FIG. 19, the drive gear 3 is rotated as the rotary shaft 1a rotates and thus, the follower gear 4 rotates at a lower speed. Hence, the rotary shaft 2a is rotated. The reduction ratio is 1/N, where N rotations of the rotary shaft 1a corresponds to one rotation of the shaft 2a. When the power supply is on, an absolute position signal of the absolute position detector 1 and its repeated signals are processed to detect the number of rotations and the angular position of the rotary shaft 1a.

If the rotary shaft 1a is rotated accidentally during a time when the power supply is off, the apparatus will produce an absolute position signal from the absolute position detector 1 upon being energized. Simultaneously, an absolute position signal from the second absolute position detector 2 is produced and then, the rotating movement of the rotary shaft 1a is calculated based upon the absolute position signals and the reduction ratio to find a number of full rotations and the number of degrees of partial rotation.

In the apparatus shown in FIG. 20, the rotation of the rotary shaft 1a is transmitted through the driver gear 3 and the follower gear 4 to the rotary shaft 5a and simultaneously, through the driver gear 7 and the follower gear 8 to the rotary shaft 6a. If the reduction ratio is 1/N for each driver to follower interface, $N^2$ rotations of the rotary shaft 1a corresponds to N rotations on the shaft 5a and one rotation on the shaft 6a. If the rotary shaft 1a is rotated accidentally while the power is off, the apparatus will produce, upon being energized, an absolute position signal with the absolute position detector 1 and two other absolute position signals with the first and second position detecting devices 5 and 6. These absolute position signals are then examined with respect to the reduction ratios so that the rotating movement of the rotary shaft 1a can be determined.

In the apparatus shown in FIG. 21, the light emitting diode 1c emits a light when the power supply is on and the emitted light passes through the slit in the rotary scale 1b and to the photosensitive diode 1d. As the rotary shaft 1a rotates, an output signal of the photosensitive diode 1d is varied depending on the rotating position. The repeating pattern of the output signal is then counted to produce a rotation signal from which the number of full rotations and the angular position of the rotary shaft 1a can be measured.

When the power supply is off, the rotation of the permanent magnet 11 mounted on the rotary shaft 1a varies a resistance of the magnetoresistive effect device 12 which is energized by the backup battery 115. Then, the resultant resistance variation is processed and stored by the rotation signal processor circuit 14a which is also energized by the backup battery 115. Hence, the procedure begins with a connection of the power supply and subsequently carries out the steps of turning on the light emitting diode 1c, latching the absolute position signal in response to an output signal of the photosensitive diode 1d, latching the rotation signal stored in the rotation signal processor circuit 14a, and combining the two signals with the composite signal processor circuit 14c for calculation of the number of full rotations and the angular position of the rotary shaft 1a.

In the apparatus shown in FIGS. 22 and 23, the rotating movement of the rotary shaft 1a is detected and stored using the magnetic bubble device 15. More specifically, a magnetic field is imposed vertical to the tip surface 15a by a permanent magnet (not shown) provided in the magnetic bubble device 15 and a current is applied to the bubble generator 15e for producing a bubble 15c. As the rotary shaft 1a rotates during an off state of the power supply, the rotation of the permanent magnet 11 causes the bubble 15c to be carried pattern by pattern throughout the transfer pattern 15b by the force due to magnetic flux leakage. In order to produce a rotation signal, a coil (not shown) wound on the magnetic bubble device 115 is energized by connecting the power supply to produce a rotating magnetic field which in turn actuates the bubble 15c to move to the magnetoresistive element 15d in order to read the original position of the bubble 15c.

The first apparatus (FIG. 19) employing a plurality of absolute position detectors for velocity reduction through a gear train is problematic in both size and production cost because the absolute position detectors are bulky and expensive and the gears must be formed by a costly precision machining process in order to limit relative rotating movement therebetween.

The second apparatus (FIG. 20) employing one absolute position detector for detecting the rotating action of each gear in the gear train is also costly because precision machined gears are still required, although the permitted relative rotating movement can be increased. Such a device is also large and is expensive to produce.

The third apparatus (FIG. 21) in which the rotating action in the absolute position detector is measured and stored to a memory which is energized by a backup battery is smaller in size and lower in cost. However, the backup battery, which is an extra requirement, has a limited operational life and must be replaced from time to time, even when a high resistance type of magnetoresistive device and a C-MOS type rotation signal processor circuit are used for energy saving.

The fourth apparatus (FIGS. 22–23) in which the rotating movement is detected with the magnetic bubble device is smaller in the size and lower in cost and requires no backup battery. However, the rotating magnetic field imposed to the tip surface of the magnetic bubble device must be uniform and consistent for proper transfer of the bubble. Otherwise, the operational reliability of the apparatus will be adversely affected. Accordingly such devices are not reliable.

SUMMARY OF THE INVENTION

It is thus a primary object of the present invention to eliminate the foregoing disadvantages attendant with the known apparatus, and to provide an improved rotating movement detecting apparatus which is compact in size, low in production cost, high in operational reliability and operable without the need for a backup battery.

The present invention utilizes micro machining technology to construct a device for measuring and storing the movement of a device. The micro machine consists of a gear train having transducers coupled thereto at various points. The gear train is coupled to a moving object through a magnetic coupling. By monitoring the output of the individual transducers, an amount of movement of the device being monitored can be calculated.

In the first embodiment of the invention, the micro machine is actuated by means of a magnetic flux generated by the magnetic flux generating device provided on an object to be examined and then, the rotating movement or displacement of the object is measured from the actuating performance of the micro machine. More specifically, the rotating movement or displacement of the rotating object is recorded through a micro machined mechanical device and the detecting apparatus thus is compact and reliable.

Also, the invention provides for a micro machine arranged opposite to a permanent magnet mounted on the rotating axis for registering the actuating performance thereof which corresponds to the rotating movement of the rotating object while the absolute value of the rotating position within one full revolution of the rotating object has been measured. Further, a rotation output device combines the absolute position value with the rotating movement of the rotating object calculated from an input signal supplied by the micro machine and outputs both the rotating movement and the absolute value of the rotating position within one full revolution of the rotating object. Accordingly, the detection of a rotating movement and a rotating position within one full revolution of the rotating object can be executed without the need for a backup battery.

Relevant components are packaged as a micro machine including a rotation detecting member arranged to be actuated by an external magnetic flux. A driver gear is arranged integral and coaxial with the rotation detecting member for meshing engagement with a follower gear. First and second detection target members are arranged integral with and coaxially of the driver and follower gears respectively, and first and second detecting elements are arranged for detecting the rotating motion of the first and second detection target members. Accordingly, the apparatus containing the micro machine is compact in size, appropriate for mass production, and very reliable.

In the second embodiment, while the driver and follower gears of the micro machine are specifically formed for intermittent meshing action, the projections of the first detection target member are equal in number to those of the rotation detecting member and also, the projections of the second detection target member are equal in number to those of the follower gear which is arranged coaxially therewith. In particular, those projections are arranged so that circumferentially intersecting areas between the projections and the first and second detecting elements, disposed opposite to the projections, are different from one another in size. Accordingly, the permitted rotating movement is increased and thus, the detecting apparatus is compact, appropriate for mass production and very reliable.

In the third embodiment, the micro machine contains a plurality of driver gears and follower gears arranged in combination for reduction of the rotational movement of the rotating detecting member triggered by an external magnetic flux. Also, a detecting element is provided for detecting the rotation of an integral detection target member, and coaxially with the last stage follower gear of the gear train. In particular, the last stage follower gear has teeth equal in number to an integer multiple of the inverse of a product of a ratio between the number of external magnetic poles and the number of the projections of the rotation detecting member and a reduction ratio of the driver and follower gears. Also, the projections of the rotation detecting member are arranged equal in number to the teeth of the last stage follower gear so that circumferentially intersecting areas between the projections and the detecting element are different in size. Accordingly, the micro machine has only one output and thus, the detecting apparatus is compact in size, appropriate for mass production, reliable, easily assembled, and low in cost.

In the fourth embodiment, each of the projections of the rotation detecting member in the micro machine are arranged at equal angular distances on the circumferential end and are formed in a T-shape having a slim leg region extending towards the axis center and along a shoulder region facing the permanent magnet mounted on the rotating object. Accordingly, magnetic flux leakage will be minimized and the rotation of the rotating object can be measured with a higher accuracy.

In the fifth embodiment, at least a portion of the detection target member facing the detecting element is formed of a magnetic material and the detecting element arranged opposite to the detection target member is a magnetoresistive device. Accordingly, the rotation of the rotating object can be measured with a higher accuracy.

In the sixth embodiment, the follower and gears are magnetized in a tooth widthwise direction and a pair of permanent magnets are arranged at both sides of the gear train in a sandwiched relationship, so that the magnetic field of the two permanent magnets suspends the follower gears. Accordingly, the frictional torque on the axis of each follower gear becomes low and the rotation can be measured with a higher accuracy.

In the seventh embodiment, the permanent magnet mounted on the rotating object is of a C-shape so as to sandwich the projection of the rotation detecting member in the micro machine from both sides. Accordingly, the rotating torque of the rotation detecting member is higher and the rotation can be measured with a higher accuracy.

In the eighth embodiment, the micro machine for storing actuating performance which corresponds to the rotation of the rotating object is arranged integral with the rotating movement calculating circuit for calculating the rotating movement of the object from an input signal supplied by the micro machine. Accordingly, a rotating movement detector unit of the embodiment is very compact, appropriate for mass production, and reliable.

BRIEF DESCRIPTION OF THE DRAWINGS

FIG. 5 is a block diagram of a rotation signal processing circuit illustrated in FIG. 1;

FIG. 11 is an enlarged partially cross sectional view illustrating a micro machine according to a fourth embodiment;

DETAILED DESCRIPTION OF THE PREFERRED EMBODIMENTS

A first embodiment of the present invention will be described with reference to FIGS. 1 to 5 in which like numbers represent like components as depicted in the explanation of the apparatuses of FIGS. 19–23.

Figure 1:
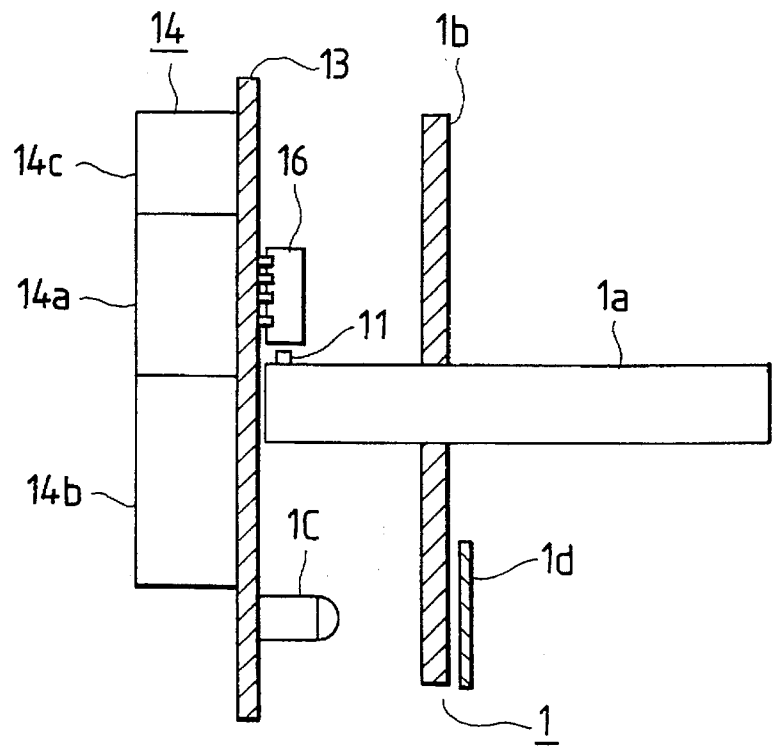
FIG. 1 is a schematic longitudinal cross sectional view illustrating a rotating movement detecting apparatus of the first embodiment of the present invention.

As shown in FIG. 1, there is provided an absolute position detector 1, for detecting the absolute position of a rotating object to be examined within one full revolution, which includes a rotary shaft 1a (connected to the rotating object), a rotary scale 1b having a slit pattern formed (not shown) therein for output of absolute position code data, a light emitting diode 1c, and a photosensitive diode 1d. Also, a permanent magnet 11' is fixedly mounted to the rotary shaft 1a and acts as a magnetic flux generating means magnetized in a given direction.

The micro machine 16, which is fabricated by a micro machining technique such as a fine processing method (including a photolithographic process, a film layer forming process, and an etching process) commonly used in the manufacturing of semiconductors, is fixedly mounted to a printed circuit board 13 so as to be opposite to the permanent magnet 11'. In operation, the micro machine 16 is activated by means of the magnetic flux produced by the permanent magnet 11' which is rotated by the rotation of the rotary shaft 1a. Accordingly, movement in micro machine 16 corresponds to the rotating movement of the rotary shaft 1a.

Also, a signal processor circuit 14 is mounted on the printed circuit board 13, which includes a rotation signal processing circuit 14a serving as a rotation calculating device for processing a signal from the micro machine 16, an absolute position signal processing device 14b for processing an output signal of the photosensitive diode 1d of the absolute position detector 1, and a composite signal processing circuit 14c serving as a rotating output device for producing a composite signal representative of the rotating movement signal and the absolute position signal. Hence, the absolute position detector 1 and the absolute position processing circuit 14b constitute an absolute position detecting circuit for detecting the absolute value of the position of the rotating object.

Figure 4:
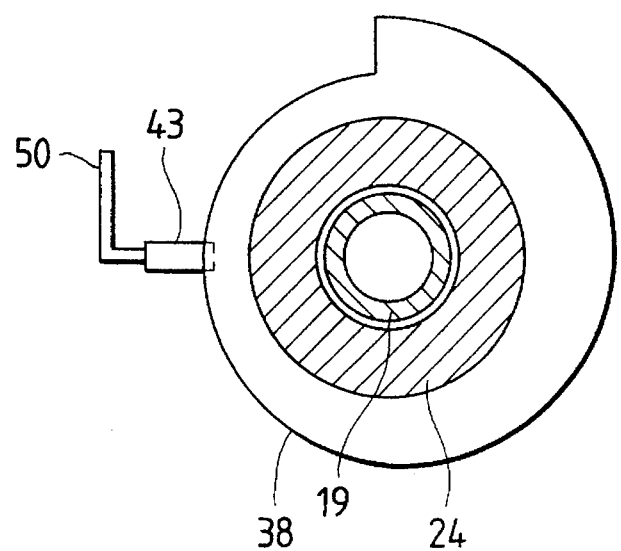
FIG. 4 is an enlarged plan view of a detection plate of the micro machine illustrated in FIG. 2.
Figure 2:
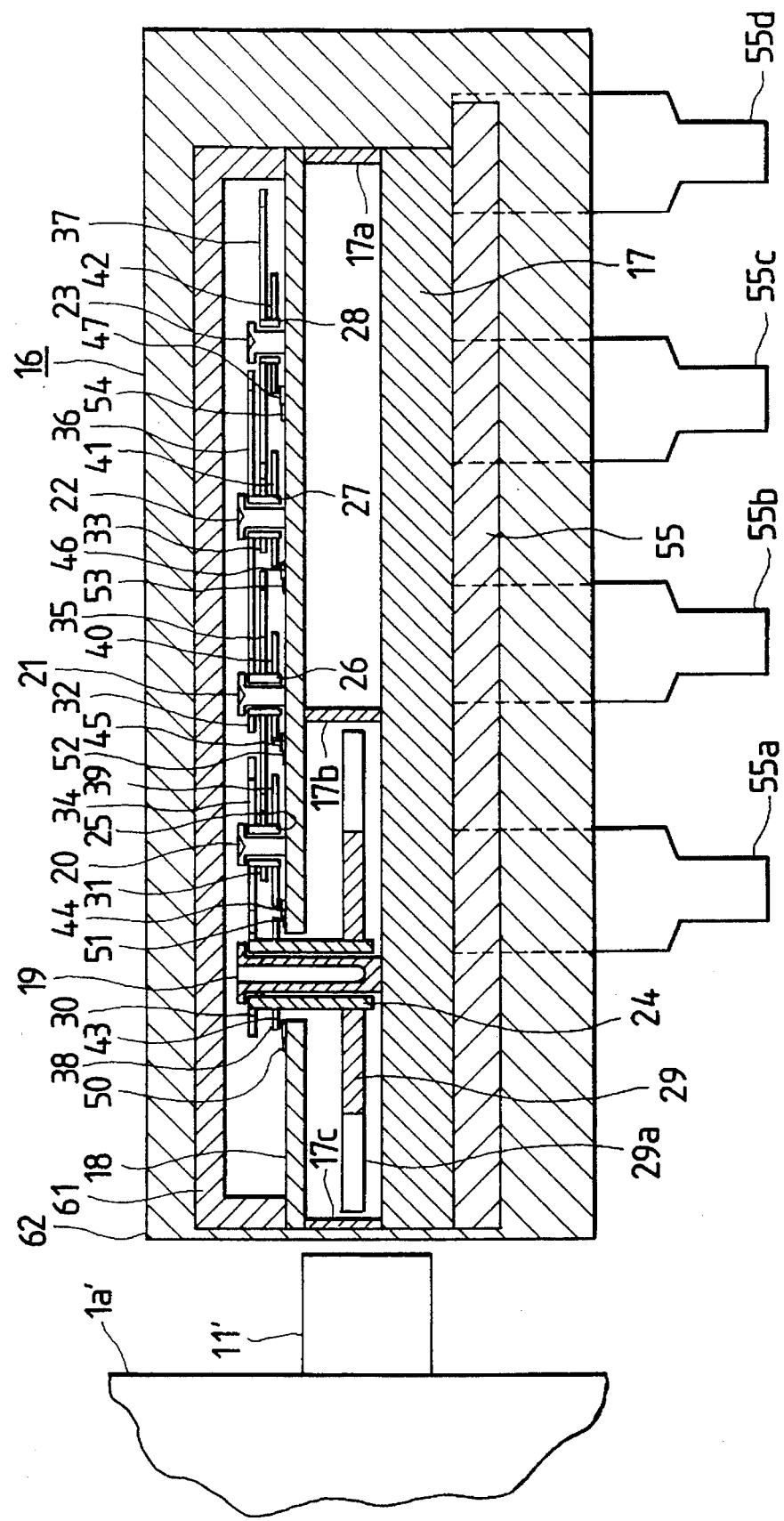
FIG. 2 is an enlarged cross sectional view of the micro machine of FIG. 1.
Figure 3:
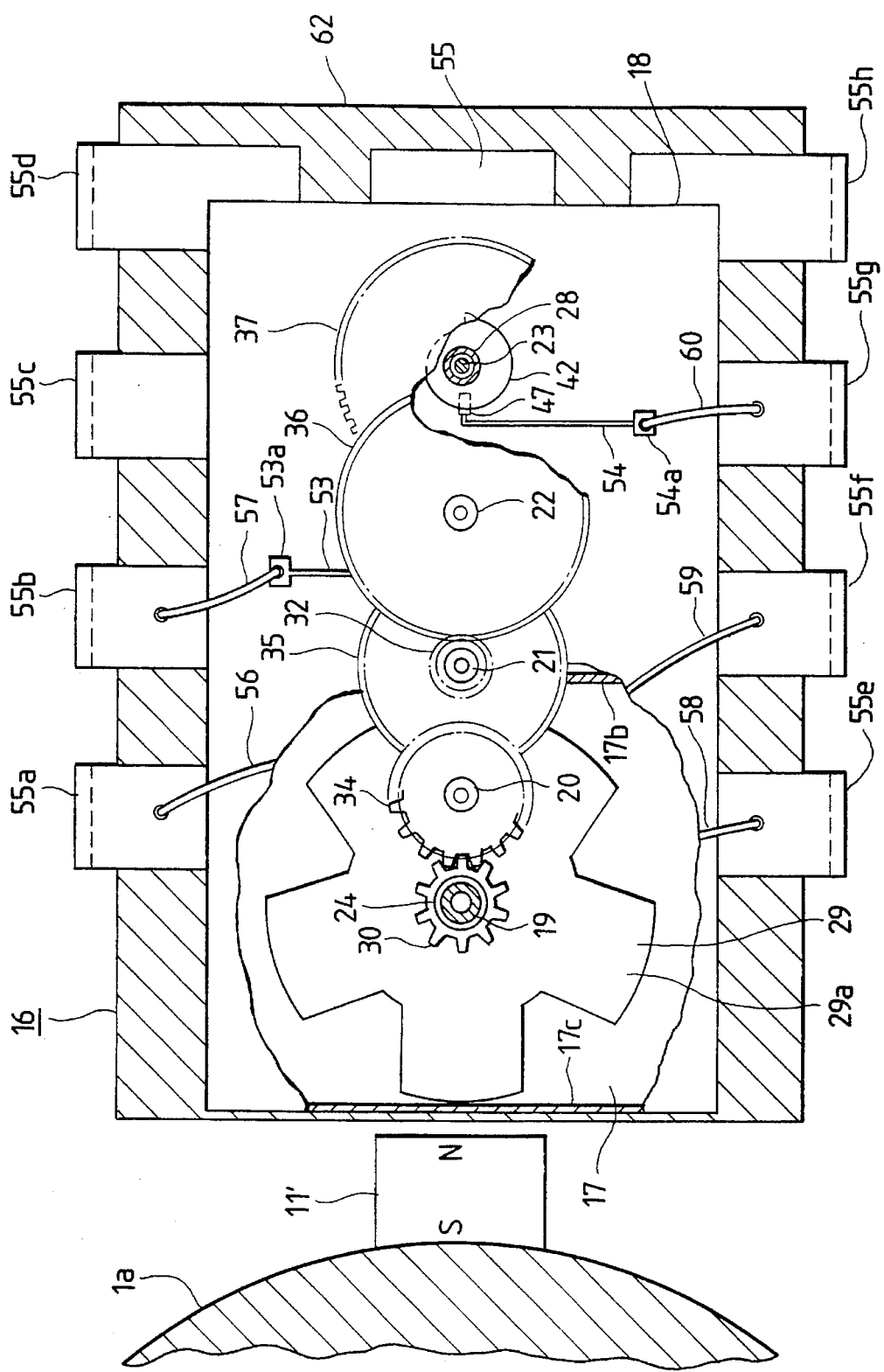
FIG. 3 is an enlarged view, in partial section, of a portion of the micro machine illustrated in FIG. 2.

As illustrated in FIGS. 2 to 4, the micro machine 16 contains a single-crystal silicon PC board 17 and three support walls 17a, 17b, and 17c formed by chemical vapor deposition (CVD) of polycrystalline silicon and bonded to the single-crystal PC board 17. A base plate 18, also formed by a CVD process from polycrystalline silicon, is fixedly mounted on the three support walls 17a, 17b, and 17c.

Also, a first stage axis pin 19 is formed of polycrystalline silicon by a CVD process and bonded onto the single-crystal silicon board 17. A second stage axis pin 20, a third stage axis pin 21, a fourth stage axis pin 22, and a fifth stage axis pin 23 are formed of polycrystalline silicon by a CVD process and are fixedly mounted on the base plate 18. Five hollow center tubes 24 to 28, also formed of polycrystalline silicon by a CVD process, are movably fitted onto respective first, second, third, fourth, and fifth stage axis pins 19 to 23.

A rotation detecting member 29 hereinafter referred to as detecting member 29 is formed integrally with the first stage hollow center tube 24. The detecting member 29 has a given number of teeth 29a formed by sputtering a magnetic metal material on the circumferential edge thereof and provides a speed reduction ratio of 1/N1. FIG. 3 illustrates five of the teeth 29a opposite to the single magnet 11', where the reduction ratio is 1/N1=1/5. Teeth 29a are coated with a thin layer of polycrystalline silicon (not shown) by the CVD process.

Four driver gears 30 to 33, formed by a CVD process of polycrystalline silicon, are arranged integral with respective first, second, third, and fourth stage hollow center tubes 24 to 28. Also, four follower gears 34 to 37, also formed by a CVD process of polycrystalline silicon, are arranged integral with their respective second, third, fourth, and fifth stage hollow center tubes 25 to 28 and aligned to mesh with the four driver gears 30 to 33, respectively.

In particular, the speed reduction ratios of the driver gears 30 to 33 of the second, third, fourth, and fifth stage follower gears 34 to 37 respectively are designed so as to be 1/N2, 1/N3, 1/N4, and 1/N5 so that the four hollow center tubes 25 to 28 can stop at given locations relative to the rotation of the rotary shaft 1a.

First, second, third, fourth, and fifth stage detection plates 38 to 42, are disposed on respective center tubes 25 to 28. The detection plates 38 to 42, also formed by a CVD process from polycrystalline silicon, are cam shaped and integral with the first, second, third, fourth, and fifth stage hollow center tubes 24 to 28 respectively.

Five detecting elements 43 to 47 are arranged by sputtering a conductive metal material to serve as electrode plates. The detecting elements 43 to 47 are coated with a thin layer (not shown) formed by a CVD process of polycrystalline silicon and are aligned in opposition to the five detection plates 38 to 42, respectively, and at a minimal distance therefrom.

Five conductors 50 to 54 are formed by sputtering a conductive metal material and coating same except at their terminals 50a to 54a (see FIG. 3) with a thin layer (not shown) formed by CVD process polycrystalline silicon. The single-crystal silicon PC board 17 is die bonded to a lead frame 55 which has lead terminals 55a and 55b coupled by wires 56 to 60 to their respective conductor terminals 50a to 54a (50a and 52a not shown). A cover and a resin package 61 and 62, respectively are provided for protection of the components. The bonding wires 56 to 60 are insulated from the base plate 18 by hermetic sealing with a glass material.

FIG. 5 is a block diagram of the rotation signal processing circuit 14a according to the first embodiment of the present invention. Illustrated are the first to fifth stage detection plates 38 to 42, the first to fifth stage detecting elements (electrode plates) 43 to 47, an analog switch 63, an oscillator circuit 64, a capacitance-to-voltage converter circuit 65, an amplifier circuit 66, an A/D converter circuit 67, and a memory circuit 68. The memory circuit 68 consists of read only memory which stores data relating to variations in the static capacitance between the detection plates 38 to 42 and their respective detecting elements (electrode plates) 43 to 47. This capacitance corresponds to segmental angles determined by dividing one full rotating movement of the first to fifth stage detection plates 38 to 42 into 1/A1, 1/A2, 1/A3, 1/A4, and 1/A5, respectively. In addition, a microcomputer 69 is provided for control and communication.

The action of the rotation detecting apparatus having the foregoing arrangement will now be described. When the rotary shaft 1a is accidentally rotated to a distance N while the main power supply is disconnected, the permanent magnet 11' rotates and thus, the detecting member 29 of the micro machine 16 is rotated N/N1 revolutions as the attraction produced by a leakage magnetic flux of the permanent magnet 11' acts on the teeth 29a of the detecting member 29.

In succession, the first stage hollow center tube 24, detection plate 38, and driver gear 30 arranged integral with the detecting member 29 are all rotated N/N1 revolutions and then, the second stage follower gear 34 meshing with the driver gear 30 is rotated N/(N1×N2) revolutions. Hence, the hollow center tube 25, detection plate 39, and driver gear 31 arranged integral with the follower gear 34 are rotated N/(N1×N2) revolutions. Similarly, the rotating movement is transmitted in reduction to the fifth stage follower gear 37 which in turn rotates N(1/N1)×(1/N2)×(1/N3)×(1/N4)×

(1/N5) revolutions together with the hollow center tube 28 and the detection plate 42 before stopping.

During this movement, the intersecting areas between the detection plates 38 to 42 and their respective detecting elements (electrode plates) 43 to 47 vary due to the cam shape of the detecting plates 38 to 42 (see FIG. 4). The area variation is repeated in every full rotation of the center tubes 24 to 28. It is understood that any unique combination of the intersecting areas between the detection plates 38 to 42 and their respective detecting elements 43 to 47 will never be repeated during N1×N2×N3×N4×N5-1 rotations of the rotary shaft 1a. Therefore, this number of rotations is designated as a permissive rotating motion. The rotating movement of the rotary shaft 1a will thus be recorded as mechanical values by the micro machine 16 within this permissive number of rotations.

The rotating movement of the rotary shaft 1a accidentally occurring during disconnection of the power supply can be examined by, after energization of the apparatus, activating the light emitting diode 1c, allowing the photosensitive diode 1d to detect and produce a detection signal, and calculating the signal with the within-one-revolution absolute position signal processing circuit 14b.

Simultaneously, the oscillator circuit 64 of the rotation signal processing circuit 14a is activated for detecting the static capacitance between the detection plates 38 to 42 and their respective detecting elements (electrode plates) 43 to 47. The measured values of the capacitance are converted by the capacitance-to-voltage converter circuit 65 to voltages which are then amplified by the amplifier circuit 66 and converted to their digital forms by the A/D converter circuit 67. The digital values are then fed as address signals to the memory circuit 68 which in turn delivers rotation angle data of the detection plates 38 to 42 corresponding to the static capacitance values. The delivery of the angle data is controlled by the microcomputer 69 which actuates the analog switch 63 to make sequential connections. The rotating angle data is then calculated by the microcomputer 69 to measure the rotating movement of the rotary shaft 1a (see FIG. 5).

Subsequently, the rotating position of the rotary shaft 1a is examined, by combining an absolute position signal and the rotating movement signals, within the composite signal processing circuit 14c. The detection plates 38 to 42 are made of a material having a high dielectric constant so that the static capacitance between the detection plates 38 to 42 and their respective detecting elements 43 to 47 is maximized, thus enhancing the S/N ratio.

Figure 6:
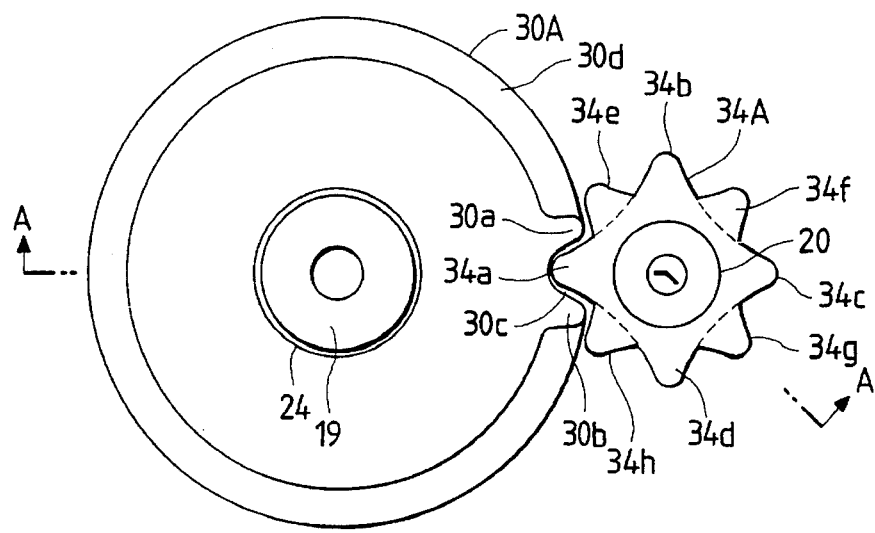
FIG. 6 is an enlarged plan view illustrating the meshing engagement between a driver gear and a follower gear in a micro machine according to a second embodiment of the present invention.
Figure 7:
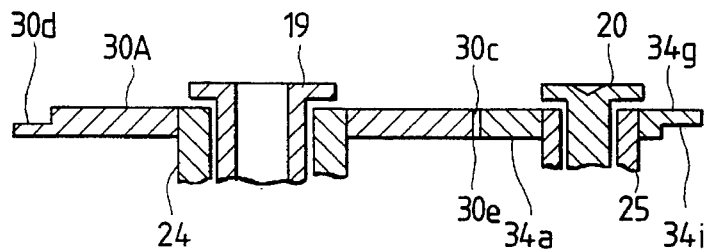
FIG. 7 is a cross sectional view of the driver and follower gears taken along the line A—A of FIG. 6.

A second embodiment of the present invention will be described referring to FIGS. 6 to 9. FIG. 6 is a plan view showing the meshing of an intermittent type driver gear with a follower gear and FIG. 7 is a cross sectional view taken along the line A—A of FIG. 6. This embodiment is similar to the first embodiment with one exception. As compared with the common meshing engagement between the driver gears 30 to 33 and the follower gears 34 to 37 in the first embodiment, a first stage driver gear 30A of the second embodiment is arranged having only two teeth portions 30a and 30b and a recessed portion 30c therebetween so as to intermittently engage with a follower gear. The remaining portion 30d of the first stage driver gear 30A is formed in a stepwise manner without teeth and recesses while another recess 30e (having the same shape as recess 30c) is formed offset from recess 30c. Also, a follower gear 34A has four teeth 34a to 34d for engagement with the recess 30c of the driver gear 30A and four other teeth 34e to 33h that do not engage with recess 30c, as shown in FIGS. 6 and 7. The toothed portions 34e to 34h have a step on their back or lower sides 34i. (Other stage driver and follower gears not shown are formed in a similar arrangement.)

Figure 8:
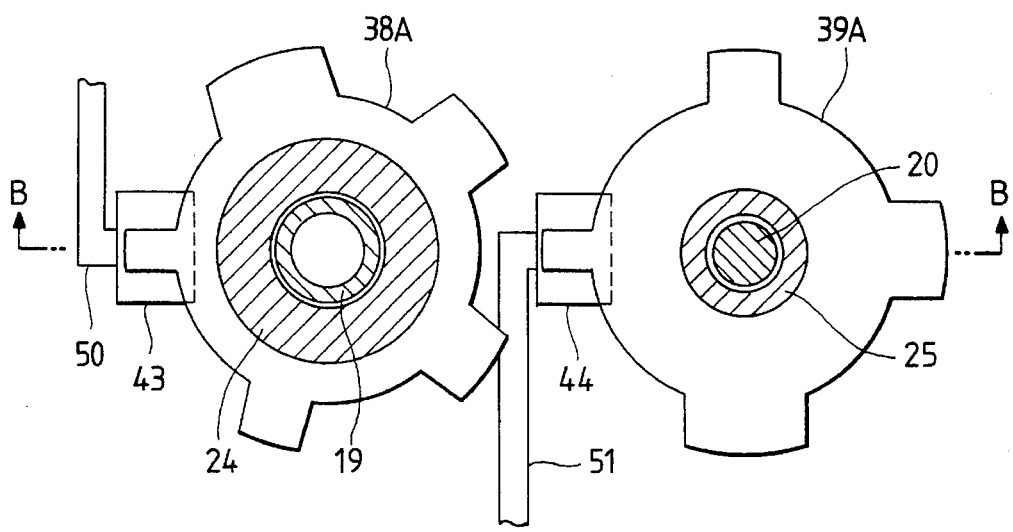
FIG. 8 is an enlarged plan view of a detection plate of the second embodiment.
Figure 9:
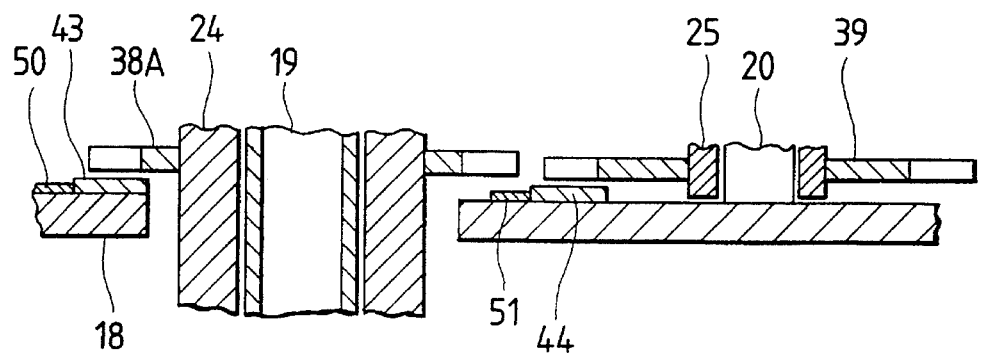
FIG. 9 is a cross sectional view of the detection plate taken along the line B—B of FIG. 8.

FIG. 8 is a plan view showing two detection plates 38A and 39A of the second embodiment, and FIG. 9 is a cross sectional view taken along the line B—B of FIG. 8. The first stage detection plate 38A has teeth which are identical in number to those of the detecting member 29 but different in size, as shown in FIGS. 8 and 9. Also, the second stage detection plate 39A has teeth which are identical in number to those (namely, four) of the follower gear 34A but different in size. (Also, third to fifth stage detection plates not shown are formed in a similar arrangement as second stage detection plate 39A.)

In operation, the follower gear 34A rotates ¼ turn as the driver gear 30A performs a full rotation. Hence, a set of gears which are aligned in a single module and arranged identical in tooth pitch and diameter can produce a higher reduction ratio than the arrangement of the first embodiment. More specifically, the resolution of the rotating movement data of the rotary shaft 1a is greater than that of the first embodiment and the permissive rotating movement is thus increased. Also, one full rotation of the driver gear triggers a ¼ rotation of each follower gear 34, 35, 36, or 37, which allows each stage detection plate to stop at any quarter location, but not intermediate locations therebetween. Accordingly, a variation in the static capacitance determined by one full rotation of the detection plate will be increased thus enhancing operational reliability.

Figure 10:
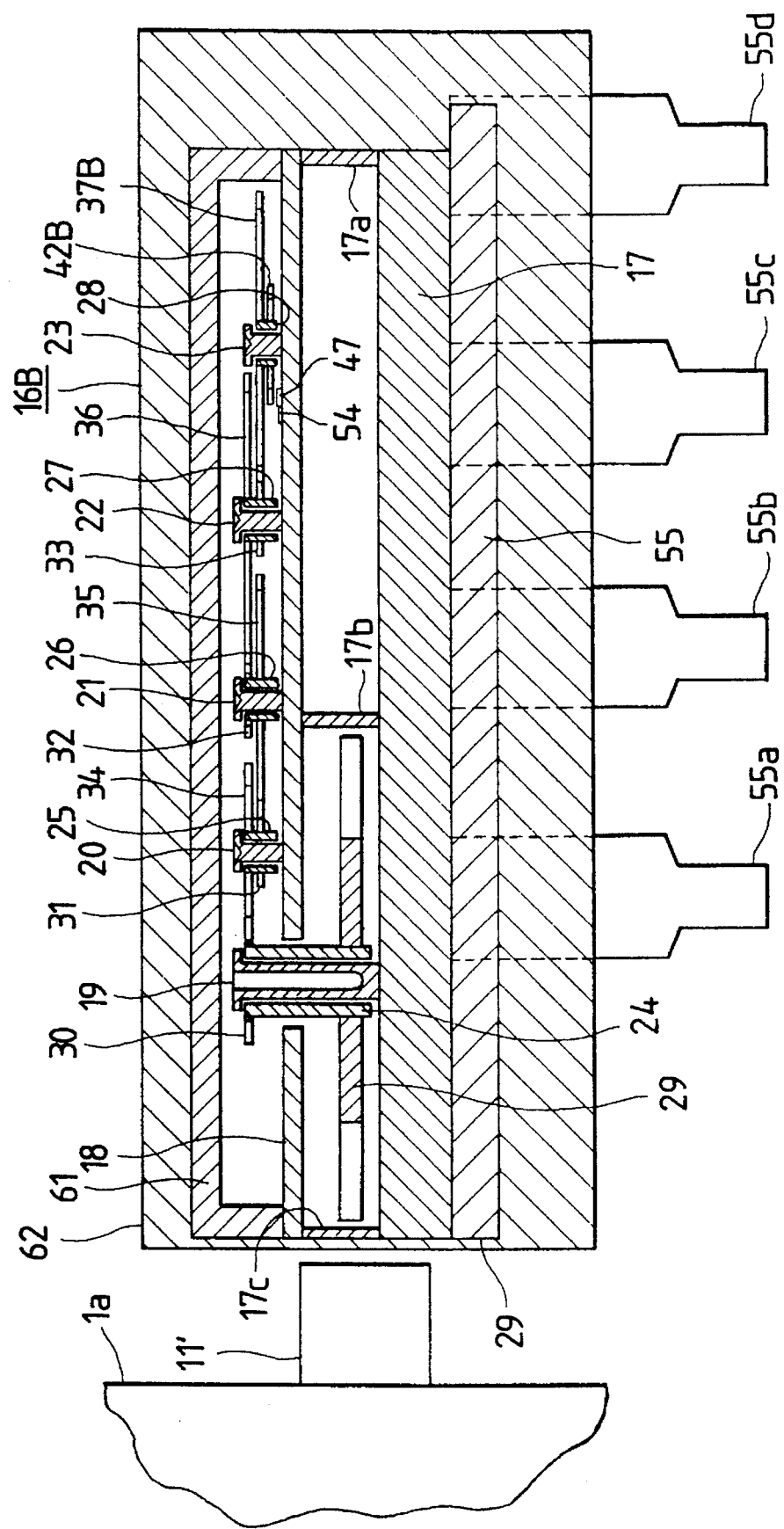
FIG. 10 is an enlarged longitudinal cross sectional view illustrating a micro machine according to a third embodiment.

A third embodiment of the present invention will be described referring to FIG. 10. FIG. 10 is an enlarged cross sectional view of a micro machine 16B according to the third embodiment. In the first embodiment, the reduction ratio (1/N1)×(1/N2)×(1/N3)×(1/N4)×(1×N5) is arbitrarily determined with the arrangement of the detection plates 38 to 42 and their respective detecting elements (electrode plates) 43 to 47. However, when the permissive rotating movement is preferably small, the number of teeth of a fifth or last stage follower gear 37B can be equal to an integer multiple of the inverse of the reduction ratio, as shown in FIG. 10.

Also, a detection plate 42B is mounted to the last stage follower gear and a corresponding detecting element (an electrode plate) 47 is provided. The detection plate 42B has teeth which are identical in number to those of the follower gear 37B but different in size. In operation, the detection plate 42B stops at every tooth location, but not intermediate locations, as the rotary shaft 1a performs one full rotation. The micro machine 16B can thus be fabricated at a lower cost than that of the first embodiment. Also, a variation in the static capacitance will be increased on each rotation of the detection plate 42B, thus enhancing operational reliability.

A fourth embodiment of the present invention will be described referring to FIG. 11. FIG. 11 is an enlarged cross sectional view of a micro machine 16C according to the fourth embodiment. As shown, each tooth 29a of a detecting member 29 is formed in a generally T-shape which comprises a facing region 29b and a slim shoulder region 29c. With this configuration, very little of the magnetic flux of the permanent magnet 11' will be leaked to the shoulder region 29c and the flux will act primarily on the facing region 29b. As the attracting force increases, the reliability of rotation of the detecting member 29 will be enhanced as compared with that of the previous embodiments.

Figure 12:
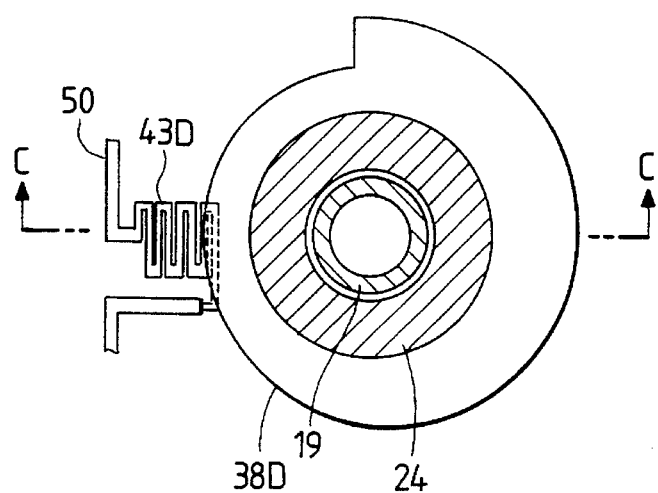
FIG. 12 is an enlarged plan view of a detection plate in a micro machine according to a fifth embodiment.
Figure 13:
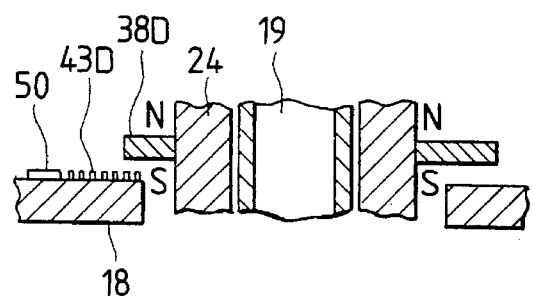
FIG. 13 is a cross sectional view of the detection plate of FIG. 12 taken along the line C—C.
Figure 14:
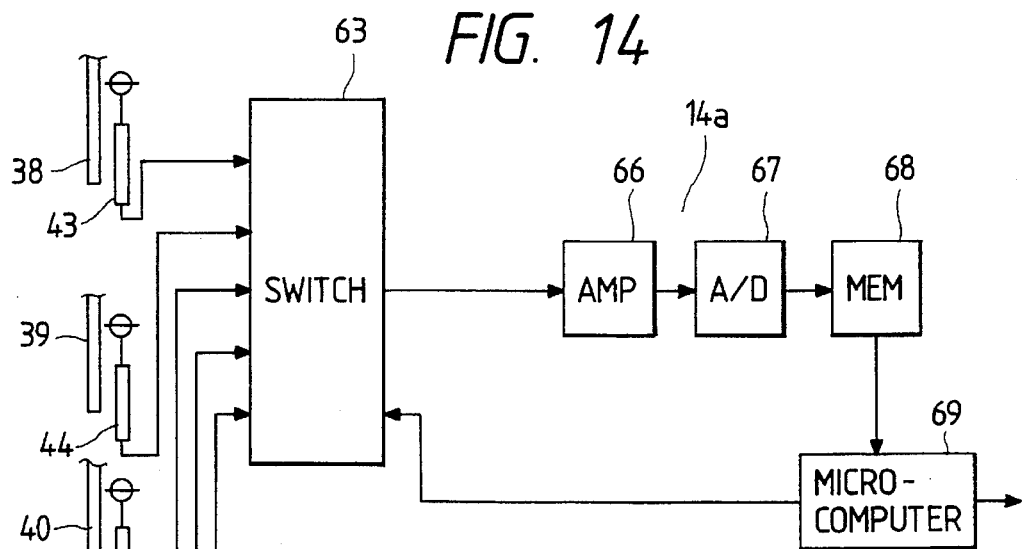
FIG. 14 is a block diagram illustrating a rotation signal processing circuit of the fifth embodiment.

A fifth embodiment of the present invention will be described referring to FIGS. 12 to 14. FIG. 12 is an enlarged plan view showing the peripheral arrangement of a detection plate 38D of the fifth embodiment and FIG. 13 is a cross sectional view taken along the line C—C of FIG. 12. FIG. 14 is a block diagram of a rotation signal processing circuit 14a. As shown in FIGS. 12 and 13, the detection plate 38D is formed by sputtering a magnetic metal material, coated over its entire surface with a thin layer (not shown) formed by a CVD process from polycrystalline silicon, and magnetized to a given polarity. Its corresponding detecting element 43D is formed of a magnetoresistive device having a common resistance value and also being formed by a sputtering process. This is in contrast to the first embodiment in which the detection plates 38 to 42 are of polycrystalline silicon and the detecting elements 43 to 47 are electrode plates of a conductive metal material. (Also, other stage detection plates 39D to 42D and detecting elements 44D to 47D are arranged in a similar manner).

The rotation signal processing circuit 14a shown in FIG. 14 comprises an analog switch 63, an amplifier 66, an A/D converter 67, a memory circuit 68, and a microcomputer 69. This embodiment eliminates the need for a capacitor to voltage conversion circuit, because a voltage can be read directly off the detecting element 43 to 47. Accordingly, this embodiment is simple in construction and lower in cost than the previous embodiments.

Figure 15:
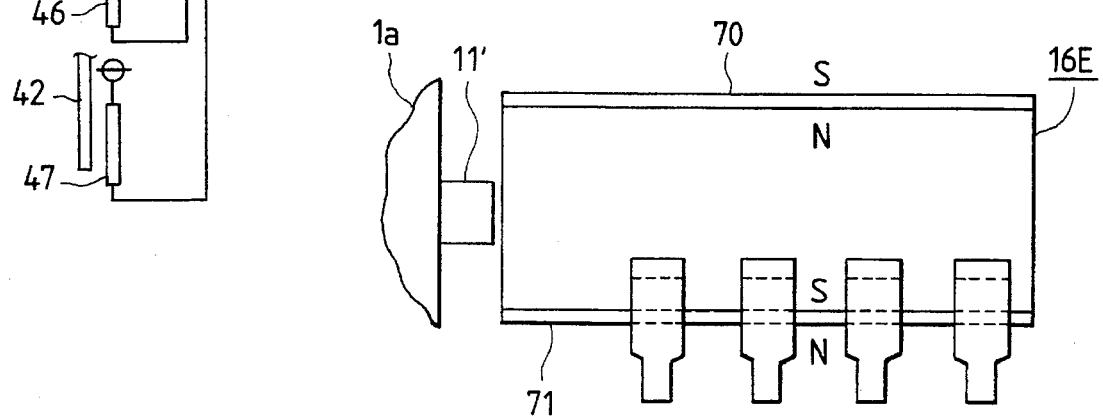
FIG. 15 is an enlarged front view illustrating a micro machine according to a sixth embodiment.
Figure 16:
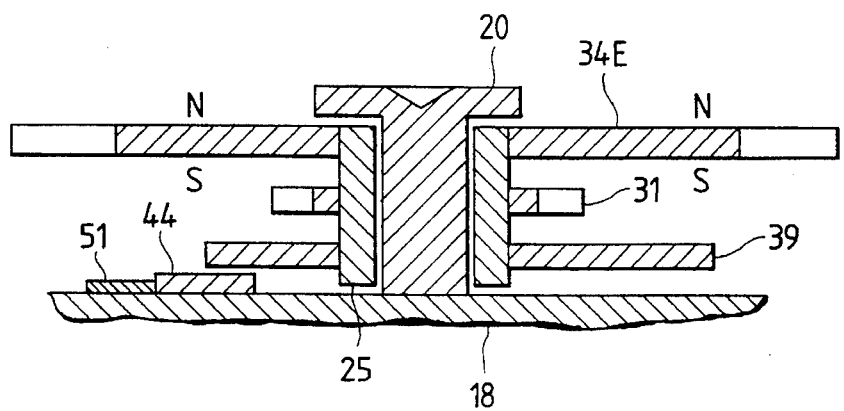
FIG. 16 is an enlarged longitudinal cross sectional view of a second stage axis of the micro machine illustrated in FIG. 15.

A sixth embodiment of the present invention will be described referring to FIGS. 15 and 16. FIG. 15 is an external view of a micro machine 16E according to the sixth embodiment and FIG. 16 is an enlarged cross sectional view showing the peripheral arrangement of a magnetized follower gear 34E. As shown, the follower gear 34E is formed by sputtering of a magnetic metal material, coated over its entire surface with a thin layer (not shown) developed by a CVD process of polycrystalline silicon, and permanently magnetized in a tooth widthwise direction. The follower gear 34E is also sandwiched between two permanent magnets 70 and 71 having magnetizing directions at right angles to that of the permanent magnet 11' mounted to the rotary shaft 1a. The magnetic field of permanent magnets 70 and 71 is equal to that of the follower gear 34E, and opposite to each other. (Other stage follower gears 35E to 37E are arranged in the same manner.)

Accordingly, the hollow center tubes 25E to 28E, arranged integrally with their respective follower gears 34E to 37E, are magnetically suspended, and thus, their frictional torque against the axis pins 20 to 23 and the base plate 18 will be lowered so as to enhance operational reliability. Although the two permanent magnets 70 and 71 of the micro machine 16E shown in FIG. 15 are disposed on the outside of a casing to sandwich the follower gear 34, they may be embedded in a casing made of resin, or the like.

Figure 17:
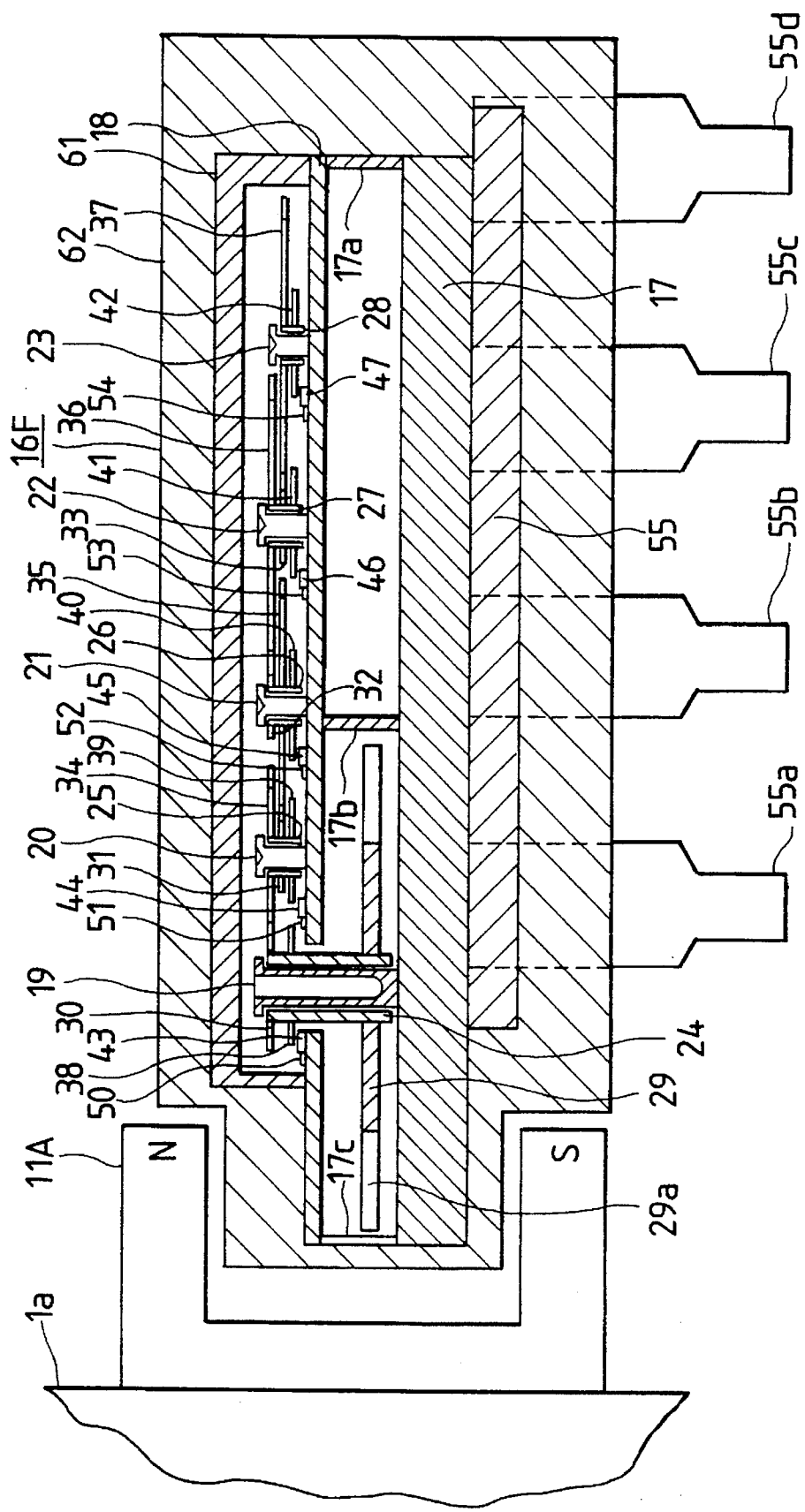
FIG. 17 is an enlarged longitudinal cross sectional view illustrating a micro machine according to a seventh embodiment.

A seventh embodiment of the present invention will be described referring to FIG. 17. FIG. 17 is an enlarged cross sectional view of a permanent magnet 11A fixedly mounted to a rotary shaft 1a and a micro machine 16F according to the seventh embodiment. As shown, the permanent magnet 11A is formed in a C-shape to sandwich the tooth 29a of the detecting member 29 installed in the micro machine 16F in a tooth thicknesswise direction so that its magnetizing direction coincides with the tooth thicknesswise direction. Accordingly, the engaging area between the magnet 11A and the tooth portion 29a is enlarged and thus, the magnetic attracting force will also increase. The rotation of the detecting member 29 will therefore be more consistent, as compared with that of the first embodiment.

Figure 18:
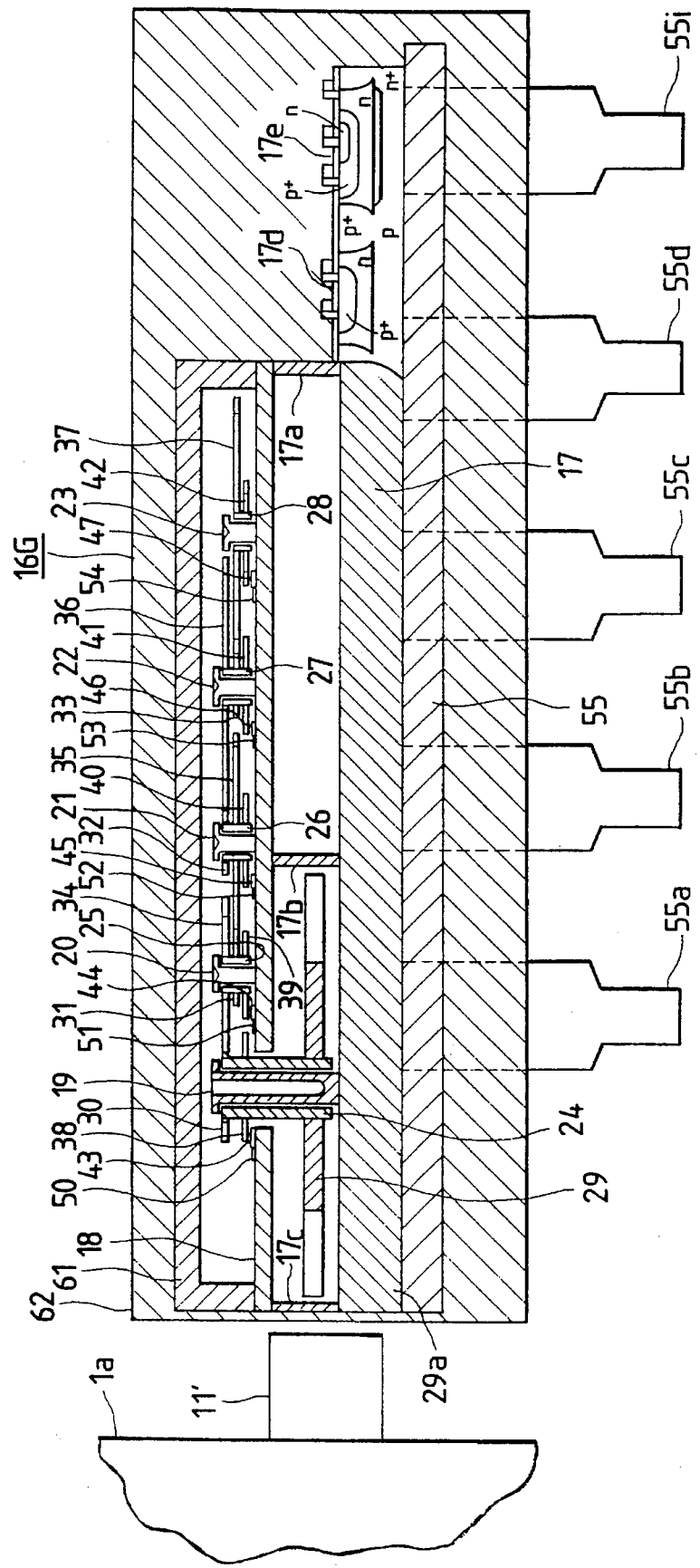
FIG. 18 is an enlarged longitudinal cross sectional view illustrating a micro machine according to an eighth embodiment.
Figure 19:
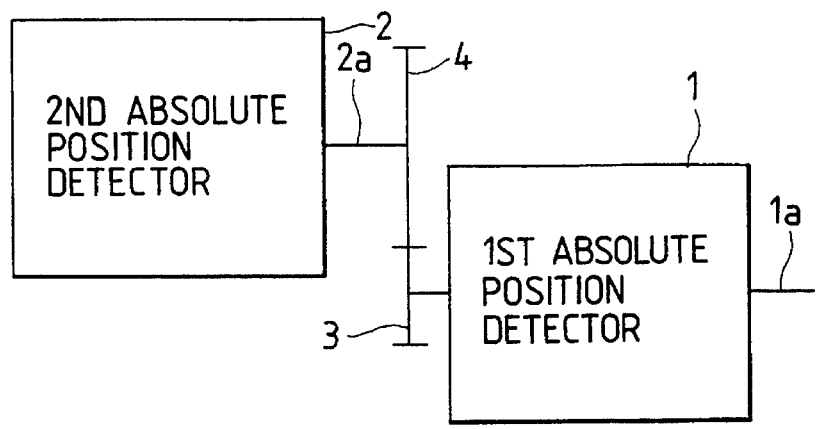
FIG. 19 is a schematic view of a conventional rotating movement detecting apparatus employing a plurality of absolute position detectors for detecting an absolute position within one full revolution.
Figure 20:
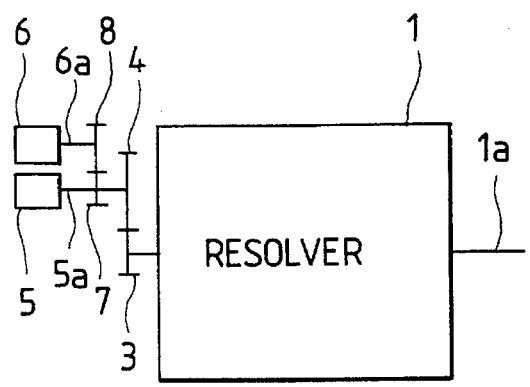
FIG. 20 is a schematic view of another conventional rotating movement detecting apparatus employing an absolute position detector and a plurality of common position detectors.
Figure 21:
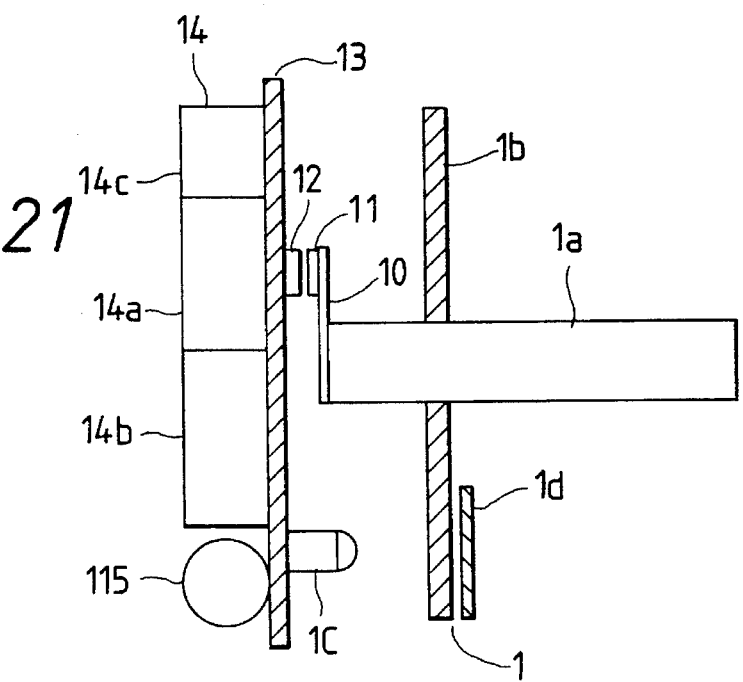
FIG. 21 is a schematic longitudinal cross sectional view of a conventional rotating movement detecting apparatus employing an absolute position detector which is energized by a backup battery.
Figure 22:
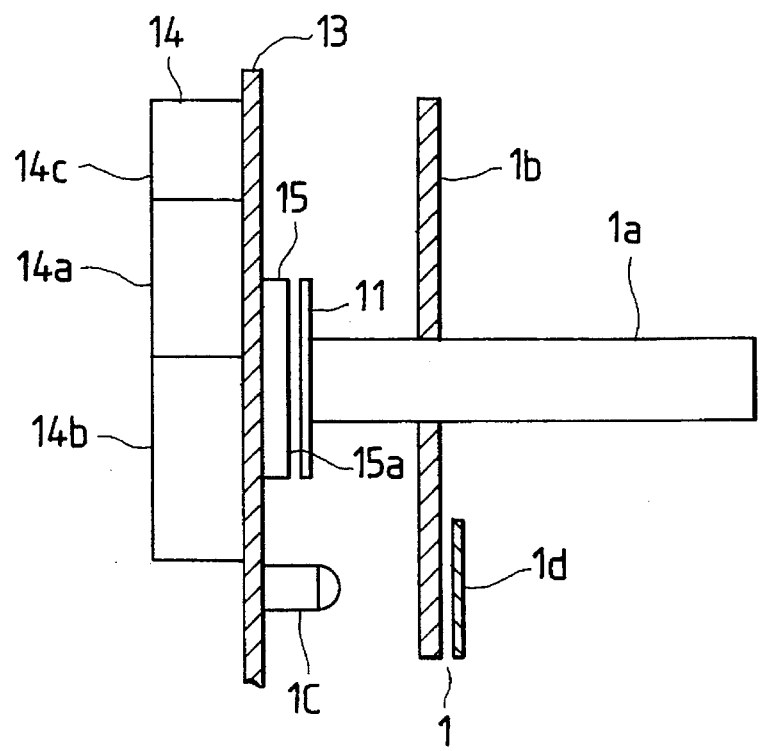
FIG. 22 is a schematic longitudinal cross sectional view of another conventional rotating movement detecting apparatus employing an absolute position detector which is energized by a backup battery.
Figure 23:
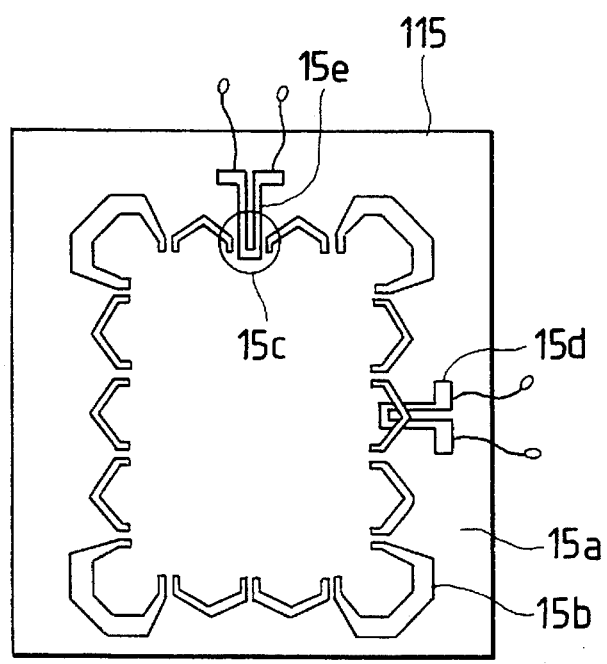
FIG. 23 is a schematic view of a conventional magnetic bubble device.

An eighth embodiment of the present invention will be described referring to FIG. 18. FIG. 18 is an enlarged cross sectional view of a micro machine 16G according to the eighth embodiment. While the rotation signal processing circuit 14a is mounted on the printed circuit board 13 in the first embodiment, it is designed, as shown in FIG. 18, to consist of the previously explained components, e.g., a resistor 17d and a transistor 17e, developed in an arrangement of P, P+, n, and n+ regions in a semiconductor PC board which is coupled to and arranged flush with the single-crystal silicon PC board 17 in the micro machine 16G. Accordingly, the wiring to the printed circuit board 13 is shortened in length and thus, the effects of noise will be minimized.

Although the method and apparatus for detecting a rotating movement described according to the first to eighth embodiments above employs an optical type absolute position detector, it may use other types, e.g., a magnetic type, or the like. Also, the preferred embodiments relate to detection of rotation. However, the invention is also applicable to an apparatus for detecting linear movement.

What is claimed is:

1. A method of detecting a displacement of an object comprising the steps of:

providing a magnetic flux generating means on said object for generating a magnetic flux which changes as a displacement of said object changes;

providing a micro machine which is formed by a CVD process, wherein said micro machine has a plurality of mechanical components and wherein at least one of said mechanical components moves to a certain position in response to said magnetic flux;

displacing said object; and measuring said displacement of said object based upon said certain position of said at least one of said mechanical elements of said micro machine.

2. An apparatus for detecting a displacement of an object comprising:

magnetic flux generating means mounted on said object for generating a magnetic flux which changes as a displacement of said object changes, wherein said magnetic flux generating means moves as said object is displaced;

a micro machine which has a plurality of mechanical components and which is disposed proximate to said magnetic flux generating means, wherein at least one of said mechanical components moves to a certain position when said magnetic flux changes and wherein said certain position of said at least one of said mechanical components corresponds to said displacement of said object; and displacement calculating means for calculating said displacement of said object based upon signals from said micro machine wherein said signals correspond to said certain position of said at least one of said mechanical components of said micro machine.

3. An apparatus according to claim 2, wherein said micro machine comprises:

a rotation detecting member having a predetermined number of projections arranged at equal angular distances on a circumferential edge thereof so as to rotate in response to said magnetic flux;

a driver gear having first engagement projections thereon and being formed integrally and coaxially with said rotation detecting member;

a follower gear having second engagement projections thereon which engage with said first engagement projections of said driver gear;

first and second detection plates formed integrally and coaxially with said driver and follower gears, respectively; and first and second detecting elements arranged opposite to said first and second detection plates, respectively, which detect a rotational position of said first and second detection plates and which output said signals to said displacement calculating means.

4. An apparatus according to claim 3, wherein said driver and follower gears are formed so as to mesh intermittently with each other, said first detection plate has detection projections formed at equal angular distances on the circumferential edge thereof and being equal in number to said projections of said rotation detecting member, said second detection plate having detection projections formed at equal angular distances on the circumferential edge thereof and being equal in number to said engagement projections of said follower gear, said detection projections being arranged so that intersecting areas between each of said detection projections and said first and second detecting elements are different from one another in size.

5. An apparatus according to claim 4, wherein each of said projections of the rotation detecting member of said micro machine arranged at equal angular distances on the circumferential end is formed of a T-shape having a slim shoulder region extending towards a rotational axis of said rotation detecting member and a long facing region facing said magnetic flux generating means.

6. An apparatus according to claim 5, wherein at least a portion of said detection plate facing said detecting element is formed of a magnetic material, and said detecting element is a magnetic detecting device.

7. An apparatus according to claim 5, wherein said micro machine is arranged integrally with said displacement calculating means.

8. An apparatus according to claim 4, wherein at least a portion of said detection plate facing said detecting element is formed of a magnetic material, and said detecting element is a magnetic detecting device.

9. An apparatus according to claim 8, wherein said micro machine is arranged integrally with said displacement calculating means.

10. An apparatus according to claim 4, wherein said follower gear is formed of a magnetic material and magnetized in a tooth widthwise direction, and wherein said micro machine further comprises a pair of permanent magnets arranged at both sides of said gear in a sandwiched relationship so that said follower gear is suspended by a magnetic field created by said pair of permanent magnets.

11. An apparatus according to claim 4, wherein said micro machine is arranged integrally with said displacement calculating means.

12. An apparatus according to claim 3, wherein said micro machine ms arranged integrally with said displacement calculating means.

13. An apparatus for detecting a rotating movement or displacement according to claim 3, wherein each of said projections of the rotation detecting member of said micro machine arranged at equal angular distances on the circumferential edge thereof is formed of a T-shape having a slim shoulder region extending towards a rotational axis of said rotation detecting member and a long facing region facing said magnetic flux generating means.

14. An apparatus according to claim 13, wherein at least a portion of said detection plate facing said detecting element is formed of a magnetic material, and said detecting element is a magnetic detecting device.

15. An apparatus according to claim 13, wherein said follower gear is formed of a magnetic material and magnetized in a tooth widthwise direction, and wherein said micro machine further comprises a pair of permanent magnets arranged at both sides of said follower gear in a sandwiched relationship so that said follower gear is suspended by a magnetic field created by said pair of permanent magnets.

16. An apparatus according to claim 13, wherein said micro machine ms arranged integrally with said displacement calculating means.

17. An apparatus according to claim 3, wherein at least a portion of said detection plate facing said detecting element is formed of a magnetic material, and said detecting element is a magnetic detecting device.

18. An apparatus according to claim 17, wherein said micro machine is arranged integrally with said displacement calculating means.

19. An apparatus according to claim 3, wherein said follower gear is formed of a magnetic material and magnetized in a tooth widthwise direction, and wherein said micro machine further comprises a pair or permanent magnets arranged at both sides of said follower gear in a sandwiched relationship so that said follower gear is suspended by a magnetic field created by said pair of permanent magnets.

20. An apparatus according to claim 2, wherein the micro machine comprises a rotation detecting member having a predetermined number of projections arranged at equal angular distances on a circumferential edge thereof for rotating movement in response to said magnetic flux, a plurality of driver gears and follower gears arranged in meshing engagement with each other so as to form a gear train with various stages of reduction of the rotating movement of the rotation detecting member, a detection plate formed integrally and coaxially with a last one of said follower gears of said gear train, and a detecting element arranged opposite to said detection plate for detecting a rotating position of said detection plate, said last one of said follower gears having teeth portions arranged equal in number to an integer multiple of the inverse of a product of, a ratio between a number of external magnetic poles of said magnetic flux generating means, and a number of said projections of the rotation detecting member, and a reduction ratio of said driver and follower gears, the projections of said rotation detecting member being arranged equal in number to said teeth of said last one of said follower gears so that circumferentially intersecting areas between each of said projections and said detecting element are different in size.

21. An apparatus according to claim 20, wherein each of said projections of the rotation detecting member of said micro machine arranged at equal angular distances on the circumferential end is formed of a T-shape having a slim shoulder region extending towards a rotational axis of said rotation detecting member and a long facing region facing said magnetic flux generating means.

22. An apparatus according to claim 21, wherein at least a portion of said detection plate facing said detecting element is formed of a magnetic material, and said detecting element is a magnetic detecting device.

23. An apparatus according to claim 21, wherein said micro machine is arranged integrally with said displacement calculating means.

24. An apparatus according to claim 20, wherein at least a portion of said detection plate facing said detecting element is formed of a magnetic material, and said detecting element is a magnetic detecting device.

25. An apparatus according to claim 24, wherein said micro machine is arranged integrally with said displacement calculating means.

26. An apparatus according to claim 20, wherein said follower gears are formed of a magnetic material and magnetized in a tooth widthwise direction, and wherein said micro machine further comprises a pair of permanent magnets arranged at both sides of said gear train in a sandwiched relationship so that said follower gears are suspended by a magnetic field created by said pair of permanent magnets.

27. An apparatus according to claim 20, wherein said magnetic flux generating means is formed in a C-shape so as to sandwich at least one of said projections of said rotation detecting member in a tooth thicknesswise direction.

28. An apparatus according to claim 20, wherein said micro machine ms arranged integrally with said displacement calculating means.

29. An apparatus according to claim 2, wherein said micro machine is arranged integrally with said displacement calculating means.

30. A method of detecting a displacement of an object having a magnetic flux associated therewith, the method comprising the steps of:

forming a micro machine on a single crystal silicon board by a CVD process using polycrystalline silicon such that said micro machine comprises:

a rotation detection member having a plurality of projections formed at equal angular distances on a circumferential edge thereof, said detection member being rotatably mounted so as to rotate in response to a change in said magnetic flux associated with said object;

a plurality of driver gears and follower gears arranged in meshing arrangement with each other so as to form a multi-stage gear train, wherein a first of said driver gears is formed integrally and coaxially with said rotation detection member so that said gear train serves as a gear reduction system for said rotation detection member;

a detection plate formed integrally with each of said driver gears; and a detecting element arranged opposite each of said detection plates, wherein an electrical characteristic of said detection elements is varied by rotation of an associated one of said detection plates;

measuring said electrical characteristic of each of said detecting elements so as to determine a rotational position of each of said driver gears; and deriving said displacement of said object based upon said rotational position of said each of said driver gears.

31. An apparatus for detecting a rotating movement of an object comprising:

absolute position detecting means for detecting an absolute value of said rotating movement within one full revolution of said object which rotates about an axis of rotation;

a magnetic flux generating means comprising a permanent magnet mounted on said object such that said permanent magnet rotates about said axis of rotation in concert with said object;

a micro machine arranged opposite to said permanent magnet so as to be actuated by means of a magnetic flux generated by said permanent magnet when said object is rotating, wherein an amount of actuation of said micro machine corresponds to said rotating movement of said object;

signal generating means, which is part of said micro machine, for generating an output signal based upon said amount of actuation of said micro machine;

rotating movement calculating means for calculating the rotating movement of the object based upon said output signal generated by said signal generating means; and rotation output means for combining a signal from said rotating movement calculating means and a signal from said absolute position detecting means, and for outputting both said rotating movement and said absolute value of said rotating movement within one full revolution of said object.

32. An apparatus according to claim 31, wherein the micro machine comprises a rotation detecting member having a predetermined number of projections arranged at equal angular distances on a circumferential edge thereof for rotating movement in response to said magnetic flux, a plurality of driver gears and follower gears arranged in meshing engagement with each other so as to form a gear train with various stages of reduction of the rotating movement of the rotation detecting member, a detection plate formed integrally and coaxially with a last one of said follower gears of said gear train, and a detecting element arranged opposite to said detection plate for detecting a rotating position of said detection plate, said last one of said follower gears having teeth portions arranged equal in number to an integer multiple of the inverse of a product of, a ratio between a number of external magnetic poles of said magnetic flux generating means, and a number of said projections of the rotation detecting member, and a reduction ratio of said driver and follower gears, the projections of said rotation detecting member being arranged equal in number to said teeth of said last one of said follower gears so that circumferentially intersecting areas between each of said projections and said detecting element are different in size.

33. An apparatus according to claim 32, wherein each of said projections of the rotation detecting member of said micro machine arranged at equal angular distances on the circumferential end is formed of a T-shape having a slim shoulder region extending towards a rotational axis of said rotation detecting member and a long facing region facing said magnetic flux generating means.

34. An apparatus according to claim 33, wherein at least a portion of said detection plate facing said detecting element is formed of a magnetic material, and said detecting element is a magnetic detecting device.

35. An apparatus according to claim 33, wherein said micro machine is arranged integrally with said rotating movement calculating means.

36. An apparatus according to claim 32, wherein at least a portion of said detection plate facing said detecting element is formed of a magnetic material, and said detecting element is a magnetic detecting device.

37. An apparatus according to claim 36, wherein said micro machine is arranged integrally with said rotating movement calculating means.

38. An apparatus according to claim 32, wherein said follower gears are formed of a magnetic material and magnetized in a tooth widthwise direction, and wherein said micro machine further comprises a pair of permanent magnets arranged at both sides of said gear train in a sandwiched relationship so that said follower gears are suspended by a magnetic field created by said pair of permanent magnets.

39. An apparatus according to claim 32, wherein said magnetic flux generating means is formed in a C-shape so as to sandwich at least one of said projections of said rotation detecting member in a tooth thicknesswise direction.

40. An apparatus according to claim 32, wherein said micro machine is arranged integrally with said rotating movement calculating means.

41. An apparatus according to claim 31, wherein said micro machine is arranged integrally with said rotating movement calculating means.

42. An apparatus according to claim 3, wherein said micro machine comprises:

- a rotation detecting member having a predetermined number of projections arranged at equal angular distances on a circumferential edge thereof so as to rotate in response to said magnetic flux;
- a driver gear having first engagement projections thereon and being formed integrally and coaxially with said rotation detecting member;
- a follower gear having second engagement projections thereon which engage with said first engagement projections of said driver gear; and
- said signal generating means comprising first and second detection plates formed integrally and coaxially with said driver and follower gears, respectively, and including first and second detecting elements arranged opposite to said first and second detection plates, respectively, which detect a rotational position of said first and second detection plates and which output said output signal to said rotating movement calculating means.

43. An apparatus according to claim 42, wherein said micro machine is arranged integrally with said rotating movement calculating means.

44. An apparatus according to claim 42, wherein at least a portion of said detection plate facing said detecting element is formed of a magnetic material, and said detecting element is a magnetic detecting device.

45. An apparatus according to claim 44, wherein said micro machine is arranged integrally with said rotating movement calculating means.

46. An apparatus according to claim 42, wherein said follower gear is formed of a magnetic material and magnetized in a tooth widthwise direction, and wherein said micro machine further comprises a pair of permanent magnets arranged at both sides of said follower gear in a sandwiched relationship so that said follower gear is suspended by a magnetic field created by said pair of permanent magnets.

47. An apparatus for detecting a rotating movement or displacement according to claim 42, wherein each of said projections of the rotation detecting member of said micro machine arranged at equal angular distances on the circumferential edge thereof is formed of a T-shape having a slim shoulder region extending towards a rotational axis of said rotation detecting member and a long facing region facing said magnetic flux generating means.

48. An apparatus according to claim 47, wherein said follower gear is formed of a magnetic material and magnetized in a tooth widthwise direction, and wherein said micro machine further comprises a pair of permanent magnets arranged at both sides of said follower gear in a sandwiched relationship so that said follower gear is suspended by a magnetic field created by said pair of permanent magnets.

49. An apparatus according to claim 47, wherein at least a portion of said detection plate facing said detecting element is formed of a magnetic material, and said detecting element is a magnetic detecting device.

50. An apparatus according to claim 47, wherein said micro machine is arranged integrally with said rotating movement calculating means.

51. An apparatus according to claim 42, wherein said driver and follower gears are formed so as to mesh intermittently with each other, said first detection plate has detection projections formed at equal angular distances on the circumferential edge thereof and being equal in number to said projections of said rotation detecting member, said second detection plate having detection projections formed at equal angular distances on the circumferential edge thereof and being equal in number to said engagement projections of said follower gear, said detection projections being arranged so that intersecting areas between each of said detection projections and said first and second detecting elements are different from one another in size.

52. An apparatus according to claim 51, wherein each of said projections of the rotation detecting member of said micro machine arranged at equal angular distances on the circumferential end is formed of a T-shape having a slim shoulder region extending towards a rotational axis of said rotation detecting member and a long facing region facing said magnetic flux generating means.

53. An apparatus according to claim 52, wherein at least a portion of said detection plate facing said detecting element is formed of a magnetic material, and said detecting element is a magnetic detecting device.

54. An apparatus according to claim 52, wherein said micro machine is arranged integrally with said rotating movement calculating means.

55. An apparatus according to claim 51, wherein said follower gear is formed of a magnetic material and magnetized in a tooth widthwise direction, and wherein said micro machine further comprises a pair of permanent magnets arranged at both sides of said gear in a sandwiched relationship so that said follower gear is suspended by a magnetic field created by said pair of permanent magnets.

56. An apparatus according to claim 51, wherein at least a portion of said detection plate facing said detecting element is formed of a magnetic material, and said detecting element is a magnetic detecting device.

57. An apparatus according to claim 56, wherein said micro machine is arranged integrally with said rotating movement calculating means.

58. An apparatus according to claim 51, wherein said micro machine is arranged integrally with said rotating movement calculating means.

\* \* \* \* \*